US 6,763,652 B2

(12) United States Patent
Baughman et al.

(10) Patent No.: US 6,763,652 B2
(45) Date of Patent: *Jul. 20, 2004

(54) VARIABLE TORQUE SPLIT AIRCRAFT GAS TURBINE ENGINE COUNTER ROTATING LOW PRESSURE TURBINES

(75) Inventors: John Lewis Baughman, Cincinnati, OH (US); Robert Joseph Orlando, West Chester, OH (US); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 66 days.

This patent is subject to a terminal disclaimer.

(21) Appl. No.: 10/253,236

(22) Filed: Sep. 24, 2002

(65) Prior Publication Data

US 2004/0055276 A1 Mar. 25, 2004

(51) Int. Cl.[7] .............................. F02G 1/06; F02G 3/10; F02G 6/00; F02G 1/00; F02G 3/00
(52) U.S. Cl. .................. 60/39.162; 415/199.5; 416/128; 60/226.1; 60/162; 60/268
(58) Field of Search .......................... 60/226.1, 39.162, 60/263; 416/128, 129, 124, 126, 198 R, 203; 415/199.5

(56) References Cited

U.S. PATENT DOCUMENTS

| | | |
|---|---|---|
| 3,224,194 A | 12/1965 | DeFeo et al. |
| 3,588,269 A | 6/1971 | Wall, Jr. |
| 4,010,608 A | 3/1977 | Simmons |
| 4,064,692 A | 12/1977 | Johnson et al. |
| 4,314,791 A | 2/1982 | Weiler |
| 4,860,537 A | 8/1989 | Taylor |
| 4,965,994 A | 10/1990 | Ciokajlo et al. |
| 4,969,325 A | 11/1990 | Adamson et al. |
| 4,976,102 A | 12/1990 | Taylor |
| 5,010,729 A | 4/1991 | Adamson et al. |
| 5,274,999 A * | 1/1994 | Rohra et al. ............... 60/226.1 |
| 5,307,622 A | 5/1994 | Ciokajlo et al. |
| 5,361,580 A | 11/1994 | Ciokajlo et al. |
| 5,404,713 A | 4/1995 | Johnson |
| 5,443,590 A | 8/1995 | Ciokajlo et al. |
| 5,809,772 A * | 9/1998 | Giffin et al. ............... 60/226.1 |
| 6,339,927 B1 | 1/2002 | DiPietro, Jr. |
| 6,393,831 B1 | 5/2002 | Chamis et al. |
| 6,619,030 B1 * | 9/2003 | Seda et al. .................. 60/226.1 |
| 6,666,017 B2 * | 12/2003 | Prentice et al. ............ 60/226.1 |
| 2003/0163983 A1 * | 9/2003 | Seda et al. .................. 60/226.1 |
| 2003/0200741 A1 * | 10/2003 | Moniz et al. ............... 60/226.1 |

* cited by examiner

Primary Examiner—Justine R. Yu
Assistant Examiner—William H. Rodriguez
(74) Attorney, Agent, or Firm—William Scott Andes; Steven J. Rosen

(57) ABSTRACT

An aircraft gas turbine engine includes a low pressure turbine having a low pressure turbine flowpath and low pressure inner and outer shaft turbines with counter rotatable low pressure inner and outer shaft turbine rotors, respectively. The low pressure inner and outer shaft turbine rotors include low pressure first and second turbine blade rows disposed across the turbine flowpath which are drivingly connected to first and second fan blade rows by low pressure inner and outer shafts, respectively. At least one row of low pressure variable vanes is operably disposed across the low pressure turbine flowpath between the low pressure inner and outer shaft turbines. The low pressure first turbine blade rows of the low pressure inner shaft turbine may be in tandem with or interdigitated with the second turbine blade rows of the low pressure outer shaft turbines.

21 Claims, 8 Drawing Sheets

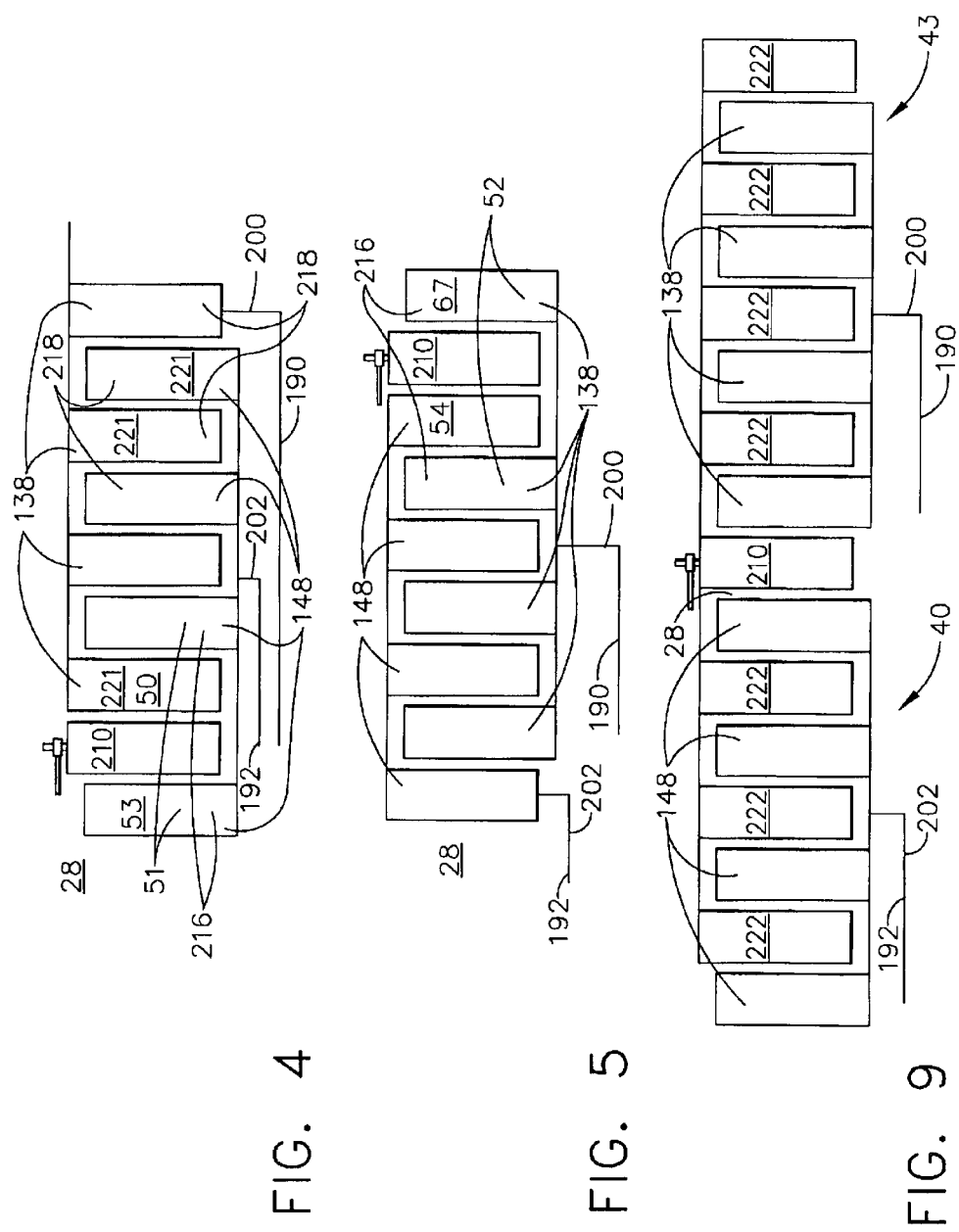

VARIABLE TORQUE SPLIT AIRCRAFT GAS TURBINE ENGINE COUNTER ROTATING LOW PRESSURE TURBINES

BACKGROUND OF THE INVENTION

1. Field of the Invention

The invention relates to counter rotating aircraft gas turbine engines with counter rotating fans driven by counter rotating low pressure turbine rotors and, particularly, for such engines incorporating vanes to effect unequal power splits and variable torque between the counter rotating low pressure turbine rotors.

2. Description of Related Art

A gas turbine engine of the turbofan type generally includes a forward fan and booster compressor, a middle core engine, and an aft low pressure power turbine. The core engine includes a high pressure compressor, a combustor and a high pressure turbine in a serial flow relationship. The high pressure compressor and high pressure turbine of the core engine are interconnected by a high pressure shaft. The high pressure compressor, turbine, and shaft essentially form the high pressure rotor. The high pressure compressor is rotatably driven to compress air entering the core engine to a relatively high pressure. This high pressure air is then mixed with fuel in the combustor and ignited to form a high energy gas stream. The gas stream flows aft and passes through the high pressure turbine, rotatably driving it and the high pressure shaft which, in turn, rotatably drives the compressor.

The gas stream leaving the high pressure turbine is expanded through a second or low pressure turbine. The low pressure turbine rotatably drives the fan and booster compressor via a low pressure shaft, all of which form the low pressure rotor. The low pressure shaft extends through the high pressure rotor. Some low pressure turbines have been designed with counter rotating turbines that power counter rotating fans and booster or low pressure compressors. U.S. Pat. Nos. 4,860,537, 5,307,622, and 4,790,133 disclose counter rotating turbines with counter rotating rotors that power counter rotating fans and booster or low pressure compressors. Most of the thrust produced is generated by the fan. Blade rows or stages of one of the counter rotating turbines, turbine rotor are interdigitated with blade rows or stages of another of the counter rotating turbine rotors. No vanes are disposed between the interdigitated rows of blades. A radially outer drum supports blade rows of one of the counter rotating turbines. These blade rows depend radially inwardly from the drum.

Advanced gas turbine commercial engines having counter rotating forward and aft fans and counter rotating boosters are being designed. It is desirable to design a counter rotating engine with a peak performance. It has been found that a peak performance can be attained when the front fan operates at a higher fan pressure ratio and higher rotational speed than the back fan. This can result in a substantial mis-match in horsepower and rotational speed between the counter rotating rotors. The counter rotating low pressure turbine is required to supply the necessary power to each of the forward and aft fans at the rotational speed of each fan. A conventional counter rotating turbine will operate at peak efficiency when the power split between both shafts is equal and when the rotational speeds are equal and opposite. In such a case, speed and horsepower ratios of the two rotors and turbines are substantially 1. It is highly desirable to have a gas turbine engine with counter rotating low pressure turbines that have different speed and horsepower ratios such as speed and horsepower ratios of 1.2 or more to attain peak fan efficiency.

SUMMARY OF THE INVENTION

An aircraft gas turbine engine includes a high pressure spool having a high pressure turbine drivingly connected to a high pressure compressor by a high pressure shaft and rotatable about an engine centerline. The gas turbine engine includes counter rotatable low pressure inner and outer spools. A low pressure turbine having a low pressure turbine flowpath is located aft of the high pressure spool. The low pressure turbine includes counter rotatable low pressure inner and outer shaft turbine rotors having low pressure inner and outer shafts, respectively, which are at least in part rotatably disposed co-axial with and radially inwardly of the high pressure spool. The low pressure inner shaft turbine rotor includes first low pressure turbine blade rows disposed across the low pressure turbine flowpath and drivingly connected to a first fan blade row by the low pressure inner shaft. The low pressure outer shaft turbine rotor includes second low pressure turbine blade rows disposed across the low pressure turbine flowpath and drivingly connected to a second fan blade row by the low pressure outer shaft. The first and second fan blade rows are disposed within a bypass duct radially outwardly bounded by a fan casing.

In some embodiments, at least some of the first low pressure turbine blade rows are interdigitated with some of the second low pressure turbine blade rows. At least one row of low pressure variable vanes is disposed between one interdigitated pair of the first and second low pressure turbine blade rows across the low pressure turbine flowpath. In other embodiments, the first low pressure turbine blade rows are not interdigitated with the second low pressure turbine blade rows. The counter rotatable low pressure inner and outer shaft turbine rotors are arranged in tandem with the inner shaft turbine rotor located aft of the outer shaft turbine rotor and the row of low pressure variable vanes disposed between the low pressure inner and outer shaft turbine rotors.

In the exemplary embodiment of the invention, at least one booster is drivingly connected to one of the low pressure inner and outer shafts and axially located between the first fan blade row and the high pressure spool. A low pressure turbine nozzle is disposed axially forward, upstream of, and adjacent to the first low pressure turbine blade rows.

BRIEF DESCRIPTION OF THE DRAWINGS

The foregoing aspects and other features of the invention are explained in the following description, taken in connection with the accompanying drawings where:

FIG. 4 is a schematic view illustration of the counter rotating low pressure turbine illustrated in FIG. 2.

FIG. 5 is a schematic view illustration of an alternative to the counter rotating low pressure turbine illustrated in FIGS. 3 and 4.

FIG. 9 is a schematic view illustration the counter rotating low pressure turbine illustrated in FIGS. 7 and 8.

DETAILED DESCRIPTION OF THE INVENTION

Figure 1:
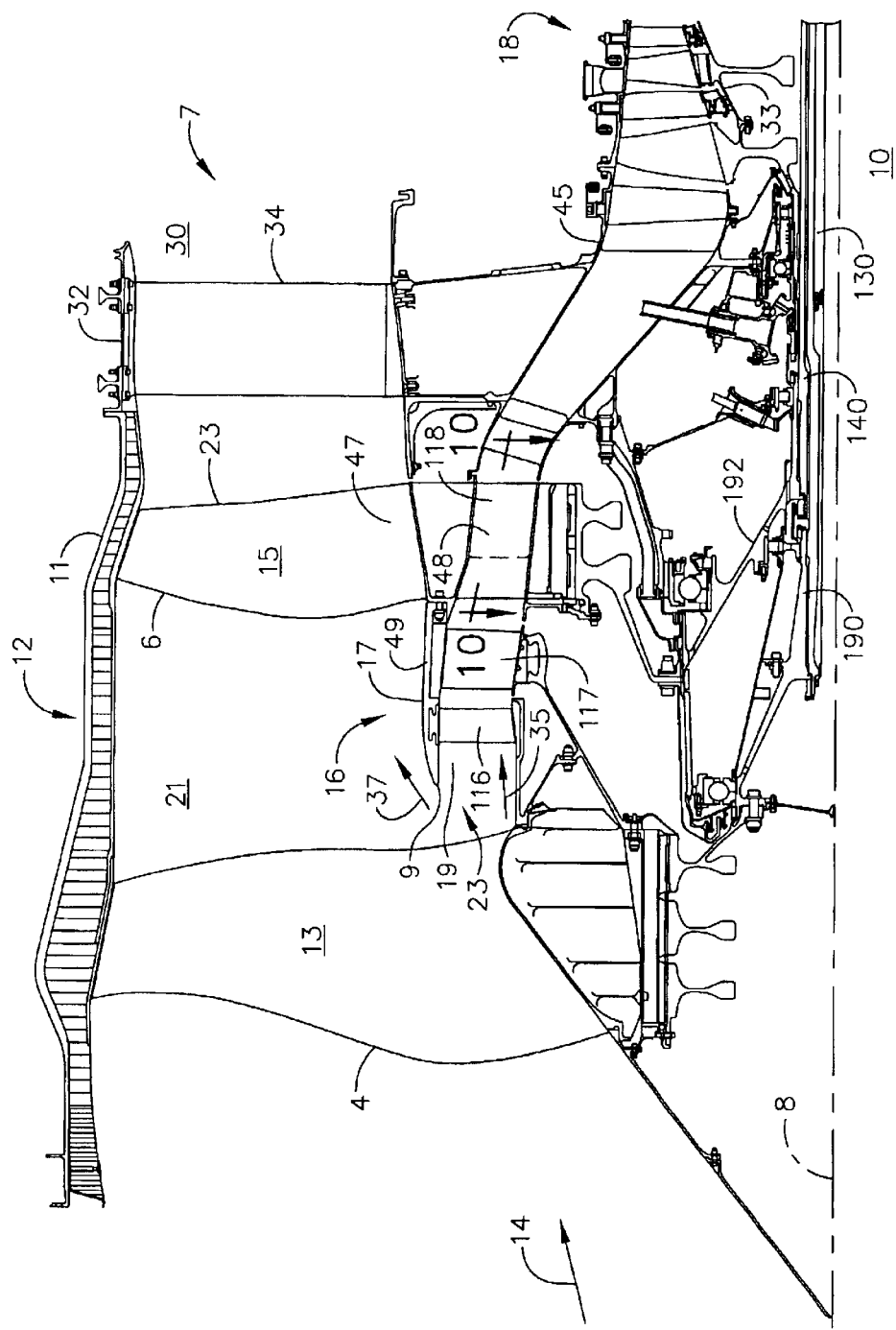
FIG. 1 is a longitudinal sectional view illustration of a forward portion of an exemplary embodiment of an aircraft turbofan gas turbine engine with a counter rotating low pressure turbine having stator vanes.

Illustrated in FIG. 1 is a forward portion 7 of an exemplary turbofan gas turbine engine 10 circumscribed about an engine centerline 8 and having a fan section 12 which receives inlet airflow of ambient air 14. The engine 10 has a frame structure 32 which includes a forward or fan frame 34 connected by engine casing 45 to a turbine center frame 60 and a turbine aft frame 155 illustrated in FIG. 2. The engine 10 is mounted within or to an aircraft such as by a pylon (not illustrated) which extends downwardly from an aircraft wing.

Figure 2:
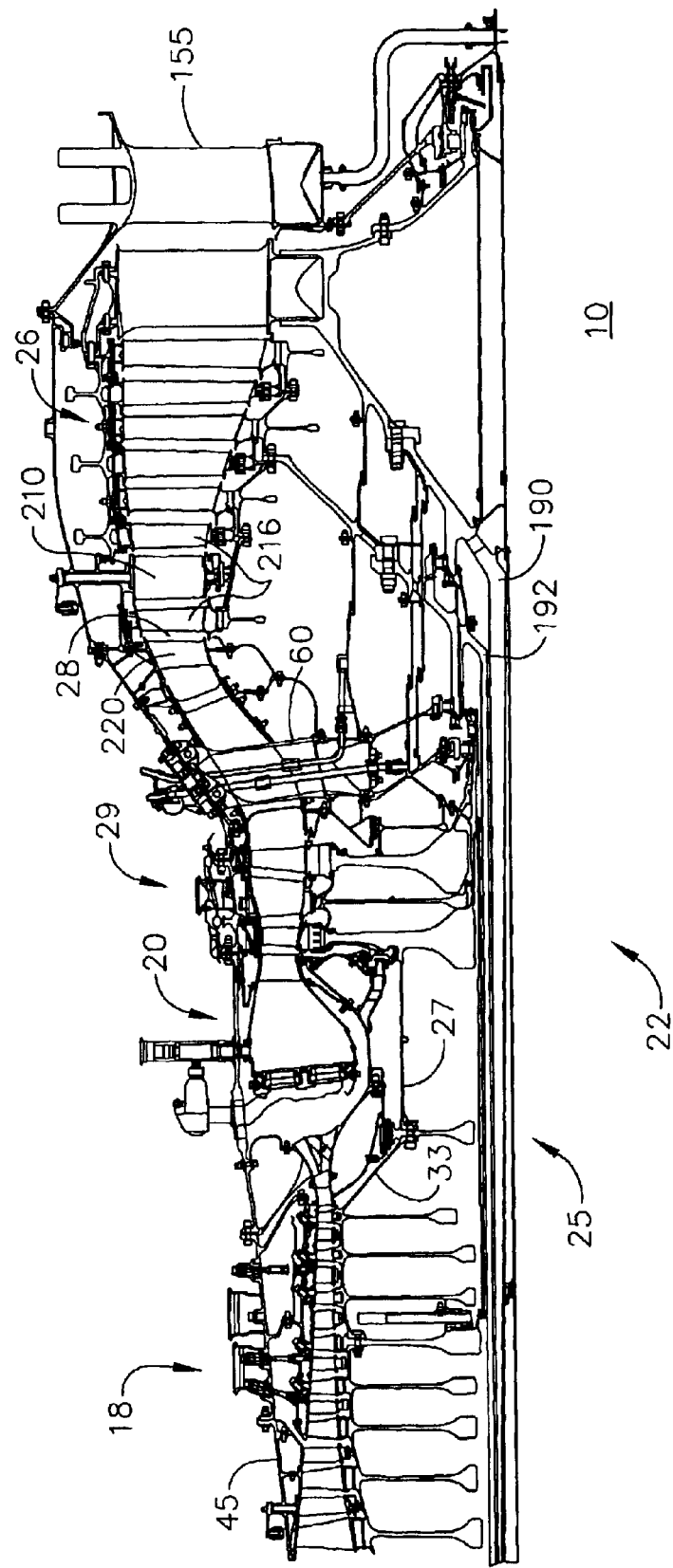
FIG. 2 is a longitudinal sectional view illustration of an aft portion of the engine.
Figure 10:
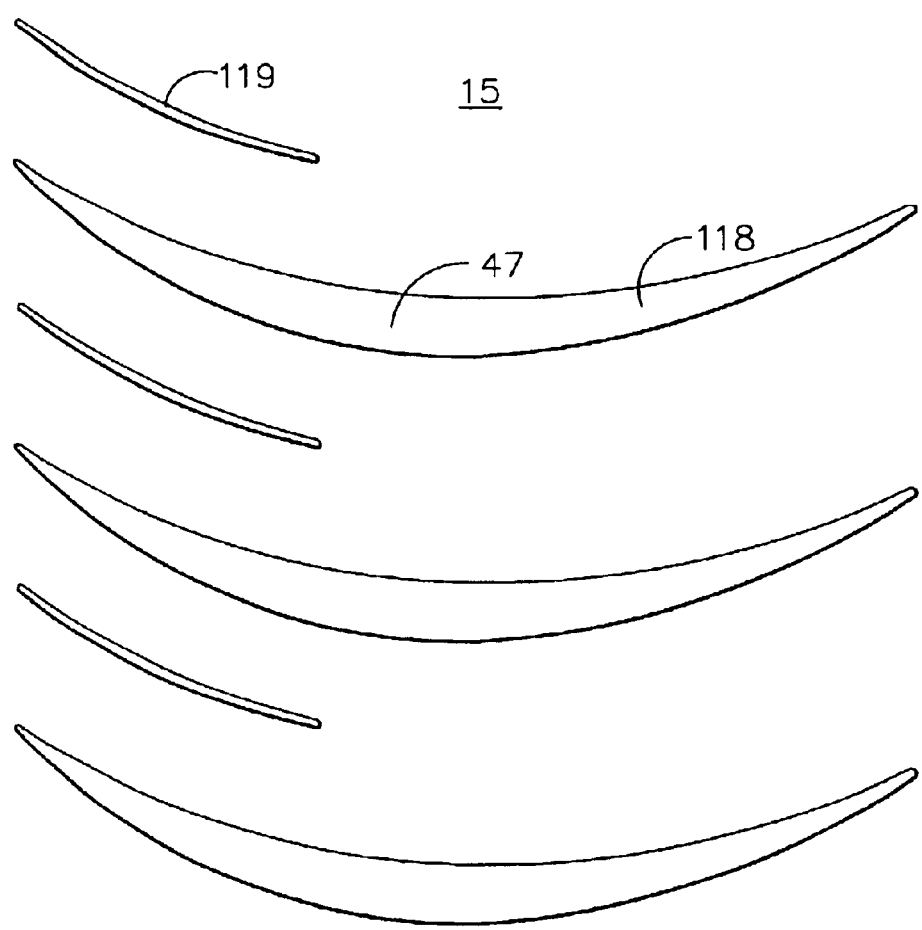
FIG. 10 is a schematic view illustration of a second row of booster blades through 10—10 in the aircraft turbofan gas turbine engine illustrated in FIG. 1.

The fan section 12 has counter rotating first and second fans 4 and 6 including first and second fan blade rows 13 and 15, respectively, and, in the exemplary embodiment of the invention illustrated herein, a booster 16. The booster 16 is a counter-rotating booster having a first row of booster blades 116 counter-rotatable with forward and aft second rows of booster blades 117 and 118 by the low pressure inner shaft 130. The first and both second rows of booster blades 116 and 117 and 118 are drivingly connected to the first and second fan blade rows 13 and 15, respectively. The booster 16 is nested between the first and second fan blade rows 13 and 15 which means it is generally axially located between the counter rotating first and second fan blade rows 13 and 15. A radially outer portion of the second fan blade row 15 is radially disposed within a bypass duct 21. Radially inner portions 48 of second fan blades 47 of the second fan blade row 15 are radially disposed within a core engine inlet 19 and form at least part of the aft second row of booster blades 118. Additional booster blades 119 may be circumferentially disposed between the radially inner portions of the second fan blades 47 as illustrated in FIG. 10. The booster 16 is surrounded by a splitter shroud 17 having a leading edge splitter 9. Boosters are generally axially located between a first fan blade row and a core engine and may be located between counter rotating first and second fan blade rows. An annular radially inner duct wall 49 radially inwardly bounds the booster 16. Following the fan section 12 is a high pressure compressor (HPC) 18 which is further illustrated in FIG. 2. FIG. 2 schematically illustrates an aft portion 22 of the engine 10.

Downstream of the HPC 18 is a combustor 20 which mixes fuel with the air 14 pressurized by the HPC 18 for generating combustion gases which flow downstream through a high pressure turbine (HPT) 29, and a counter rotating low pressure turbine (LPT) 26 from which the combustion gases are discharged from the engine 10. A high pressure shaft 27 joins the HPT 29 to the HPC 18 to substantially form a first or high pressure spool 33 (also referred to as a high pressure rotor). The high pressure compressor 18, combustor 20, and high pressure turbine 29 collectively are referred to as a core engine 25 which includes, for the purposes of this patent, the high pressure shaft 27. The core engine 25 may be modular such that as a single unit it can be independently replaced separate from the other parts of the gas turbine.

Referring back to FIG. 1, a bypass duct 21 is radially outwardly bounded by a fan casing 11 and in part the splitter shroud 17. The first and second fan blade rows 13 and 15 are disposed within the bypass duct 21 which is radially outwardly bounded by the fan casing 11. The splitter shroud 17 and leading edge splitter splits first fan flow air 23 exiting the first fan blade row 13 into a fan flow air first portion 35 into the booster 16 and a fan flow air second portion 37 around the booster 16 into the bypass duct 21 where it then exits the fan section 12 through a fan exit 30 providing thrust for the engine. The fan flow air first portion 35 pressurized by the booster 16, exits the booster into the high pressure compressor 18 of the core engine 25.

Figure 3:
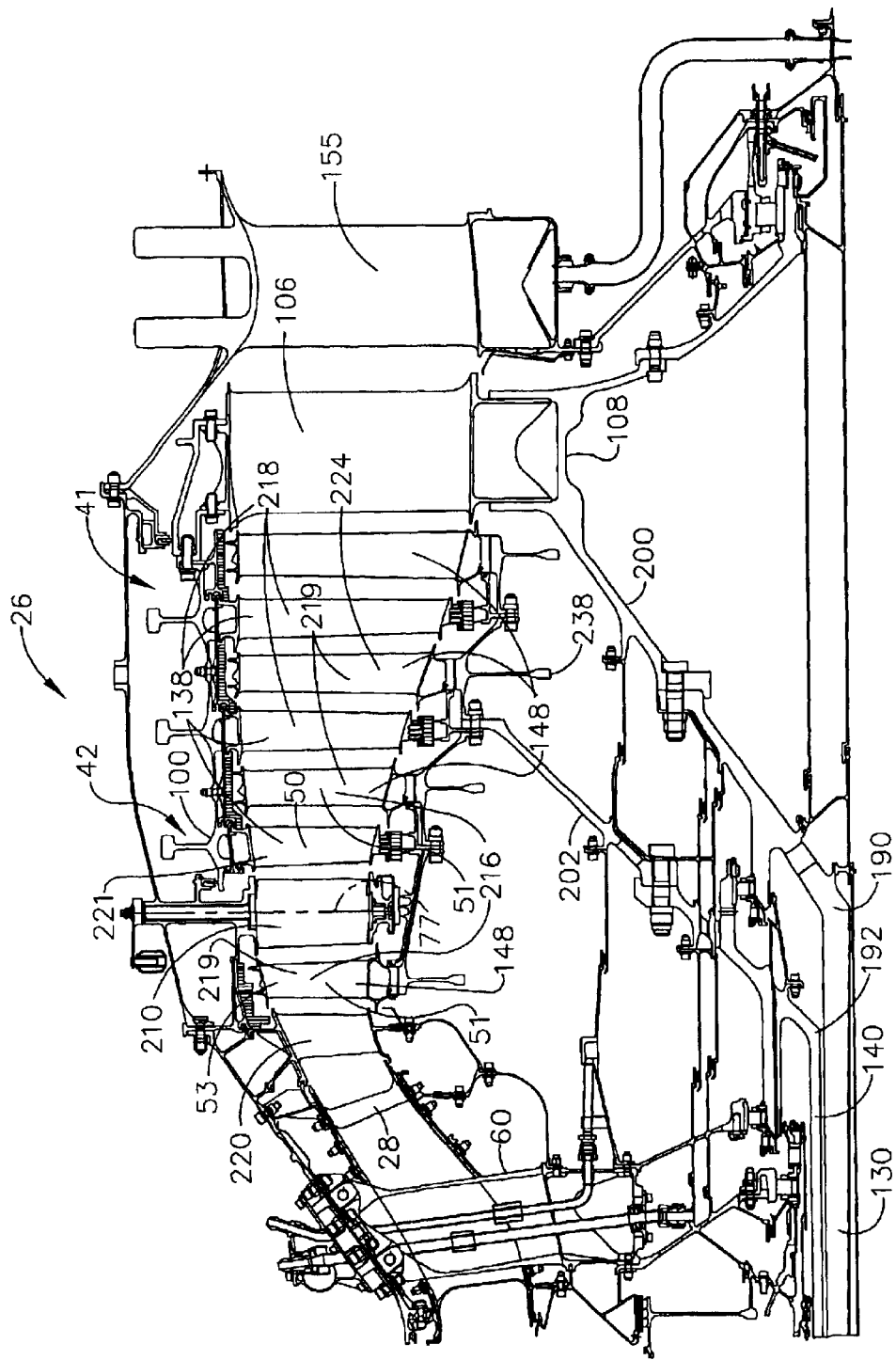
FIG. 3 is an enlarged view illustration of the counter rotating low pressure turbine illustrated in FIG. 1.
Figure 6:
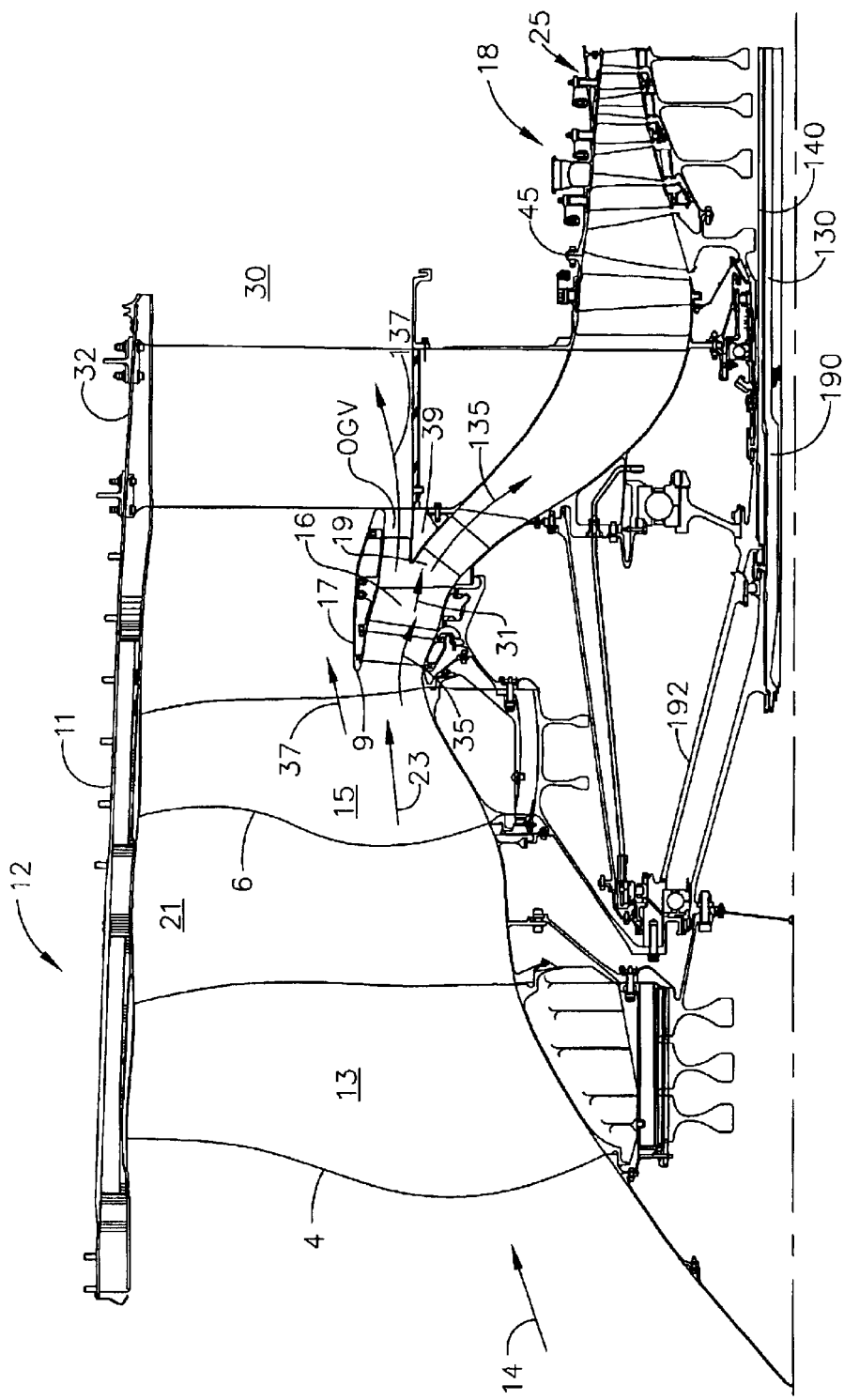
FIG. 6 is a longitudinal sectional view illustration of a forward portion of a second exemplary embodiment of an aircraft turbofan gas turbine engine with a counter rotating low pressure turbine having stator vanes.
Figure 7:
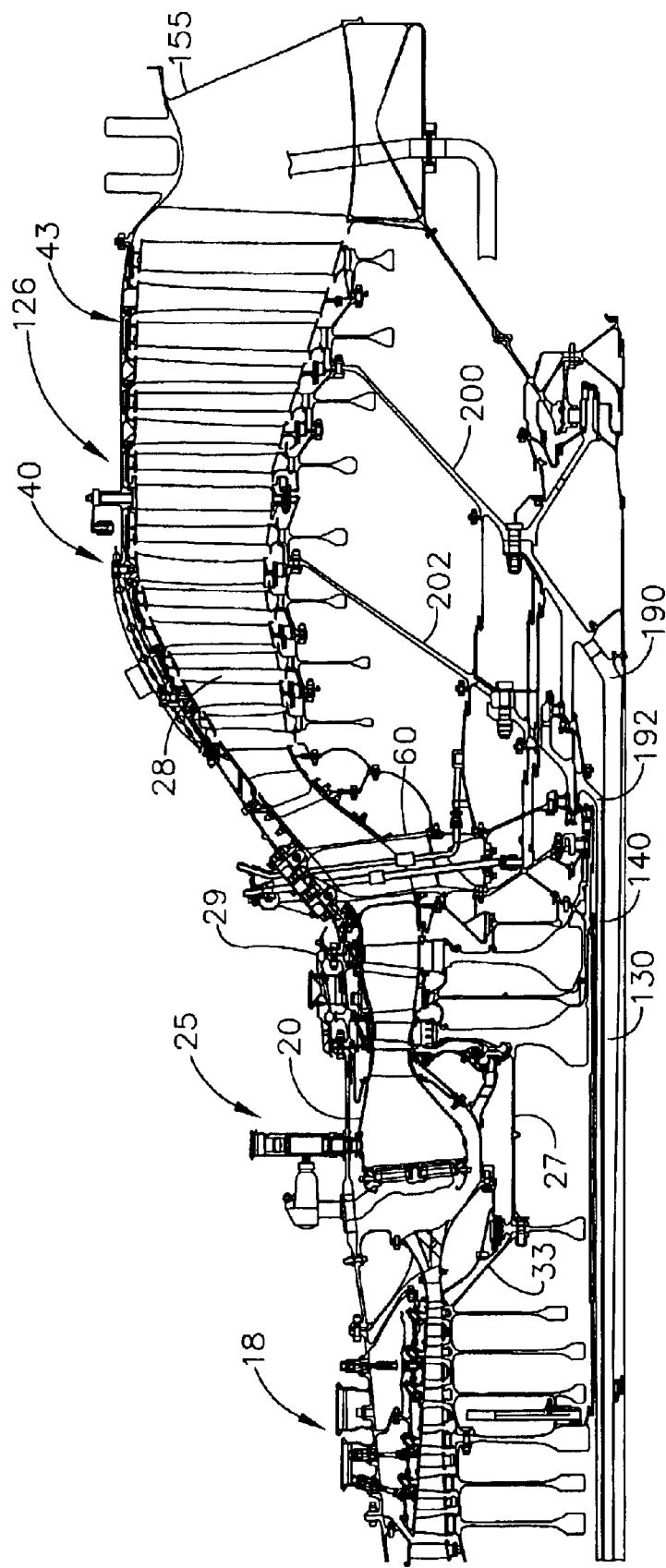
FIG. 7 is a longitudinal sectional view illustration of an aft portion of the engine having an alternative counter rotating low pressure turbine for the engine illustrated in FIG. 6.
Figure 8:
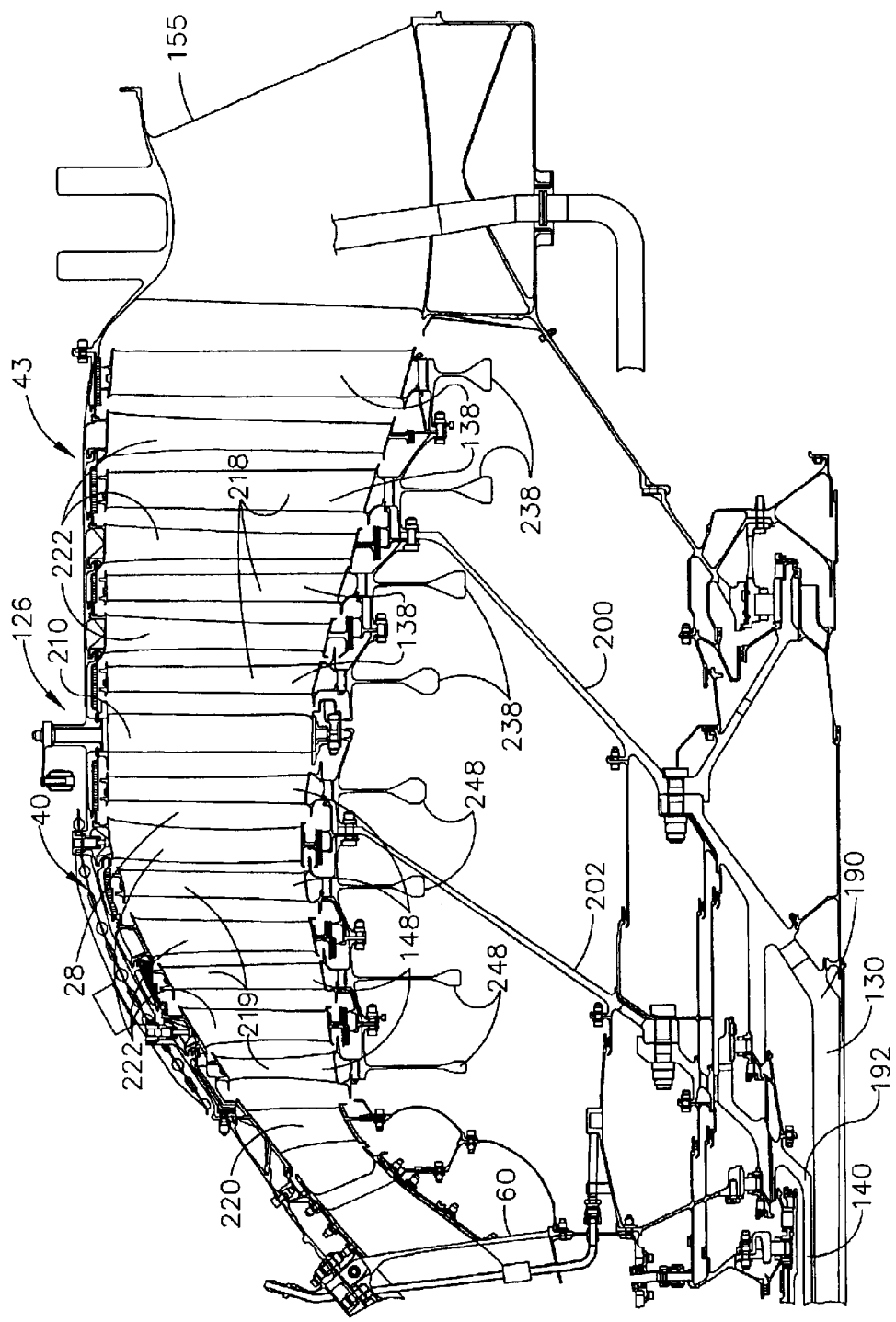
FIG. 8 is an enlarged view illustration of the alternative counter rotating low pressure turbine in aft portion of the engine illustrated in FIG. 7.

Referring now to FIGS. 2, 3, and 4, the low pressure turbine 26 includes a low pressure turbine flowpath 28. The low pressure turbine 26 includes counter rotatable low pressure inner and outer shaft turbines 41 and 42 having low pressure inner and outer shaft turbine rotors 200 and 202, respectively. The low pressure inner and outer shaft turbine rotors 200 and 202 include low pressure first and second turbine blade rows 138 and 148 disposed across the low pressure turbine flowpath 28, respectively. Counter rotatable low pressure inner and outer spools 190 and 192 include the low pressure inner and outer shaft turbine rotors 200 and 202 drivingly connected to the first and second fan blade rows 13 and 15 by low pressure inner and outer shafts 130 and 140, respectively.

The low pressure inner and outer shafts 130 and 140 are at least in part rotatably disposed co-axially with and radially inwardly of the high pressure spool 33. In the exemplary embodiment illustrated in FIGS. 2 and 3, there are four rows each of the first and second low pressure turbine blade rows 138 and 148. The booster 16 is drivingly connected to one of the low pressure inner and outer shafts 130 and 140 and are part of the low pressure inner and outer spools 190 and 192, respectively. A turbine nozzle 220 is disposed axially forward, upstream of, and adjacent to the first low pressure turbine blade rows 138.

The low pressure inner and outer shaft turbines 41 and 42 illustrated in FIGS. 2 and 3 are interdigitated. The first low pressure turbine blade rows 138 includes at least one first interdigitated turbine blade row 221 disposed between at least one adjacent interdigitated pair 216 of the second low pressure turbine blade rows 148. The second low pressure turbine blade rows 148 includes at least one second interdigitated turbine blade row 224 disposed between at least one first adjacent pair 218 of the first low pressure turbine blade rows 138. At least one row of low pressure variable vanes 210 is disposed between the interdigitated pair 216 of the first and second low pressure turbine blade rows 138 and 148 across the low pressure turbine flowpath 28. Low pressure variable vanes 210 are commonly used in compressors and typically are ganged to be rotated about vane axis 77 that intersect the engine centerline 8. They have also been developed for use in turbines. The low pressure variable vanes 210 allows control of torque split between the counter rotatable low pressure inner and outer shaft turbines 41 and 42 in order to provide better control of operating efficiency of the engine.

Illustrated in FIGS. 2 and 3 and schematically in FIG. 4 is an embodiment of the low pressure turbine 26 in which a first forwardmost row 50 of the first low pressure turbine blade rows 138 is interdigitated with a forwardmost pair 51 of the low pressure second turbine blade rows 148. The row of low pressure variable vanes 210 is disposed axially between a second forwardmost row 53 of the forwardmost pair 51 of the low pressure second turbine blade rows 148 and the first forwardmost row 50 of the first low pressure turbine blade rows 138.

Generally, FIG. 4 further illustrates that the adjacent pair 218 is interdigitated and one interdigitated row 221 of the first or second low pressure turbine blade rows 138 and 148 is interdigitated with an adjacent pair 218 of another of the first or second low pressure turbine blade rows 138 and 148. Generally, FIG. 4 yet further illustrates a first number, illustrated as four, of the low pressure first turbine blade rows 138 are interdigitated with a second number, illustrated as four, of the low pressure second turbine blade rows 148.

Illustrated schematically in FIG. 5 is another embodiment of the low pressure turbine 26. An aftmost row 54 of the second low pressure turbine blade rows 148 is interdigitated with an aftmost pair 52 of the low pressure first turbine blade rows 138. The row of low pressure variable vanes 210 is disposed axially between a second aftmost row 67 of the aftmost pair 52 of the low pressure turbine blade rows 138 and the aftmost row 54 of the second low pressure turbine blade rows 148.

The embodiments illustrated above have four second low pressure turbine blade rows 148 and four first low pressure turbine blade rows 138. Other embodiments may have two or more second low pressure turbine blade rows 148 and two or more first low pressure turbine blade rows 138. All of the second low pressure turbine blade rows 148 are interdigitated with the first low pressure turbine blade rows 138. Referring to FIG. 3, the first low pressure turbine blade rows 138 are mounted on a low pressure radially outer turbine drum 100. The turbine drum 100 is part of the low pressure inner shaft turbine rotor 200. An aftmost or fourth third row 106 of the first low pressure turbine blade rows 138 is part of a rotating frame 108 which supports the radially outer turbine drum 100 and is rotatably supported by a center frame 60 and a turbine aft frame 155. The low pressure outer shaft turbine rotor 202 is illustrated as having the four second low pressure turbine blade rows 148 mounted on low pressure first turbine disks 238.

Illustrated in FIGS. 6–9 is an alternative embodiment of the engine 10 and an alternative embodiment of the low pressure turbine 26. This embodiment has a single stage booster 16 with no counter rotating counterpart and a tandem non-interdigitated counter rotating low pressure turbine 126 incorporating vanes between the first low pressure turbine blade rows 138 and the second low pressure turbine blade rows 148. The booster 16 is axially located aft of the counter rotating first and second fan blade rows 13 and 15 and is surrounded by a splitter shroud 17 having a leading edge splitter 9. The first and second fan blade rows 13 and 15 are disposed within a bypass duct 21 which is radially outwardly bounded by a fan casing 11. The splitter shroud 17 and leading edge splitter 9 splits fan flow air 23 exiting the second fan blade row 15 into a fan flow air first portion 35 into the booster 16 and a fan flow air second portion 37 around the booster 16 into the bypass duct 21 where it then exits the fan section 12 through a fan exit 30 providing thrust for the engine. Booster air 31, pressurized by the booster 16, exits the booster and is split into booster air first and second portions 135 and 137, respectively, by an inlet duct splitter 39. The inlet duct splitter 39 directs the booster air first portion 135 into an core engine inlet 19 leading to the high pressure compressor 18 of the core engine 25. The inlet duct splitter 39 also directs the booster air second portion 137 around the core engine 25 into the bypass duct 21 where it then exits the fan section 12 through the fan exit 30.

Downstream of the HPC 18 is a combustor 20 which mixes fuel with the booster air first portion 135 pressurized by the HPC 18 for generating combustion gases which flow downstream through a high pressure turbine (HPT) 29, and the tandem non-interdigitated counter rotating low pressure turbine section 126 from which the combustion gases are discharged from the engine 10. A high pressure shaft 27 joins the HPT 29 to the HPC 18 to substantially form a first or high pressure spool 33. The high pressure compressor 18, combustor 20, and high pressure turbine 29 collectively are referred to as a core engine 25 which includes, for the purposes of this patent, the high pressure shaft 27. The core engine 25 may be modular such that as a single unit it can be independently replaced separate from the other parts of the gas turbine.

The low pressure turbine 126 includes tandem non-interdigitated counter rotating forward and aft low pressure turbines 40 and 43 and a low pressure turbine flowpath 28. The low pressure inner spool 190 includes the aft low pressure turbine 43 and the low pressure outer spool 192 includes the forward low pressure turbine 40. The aft low pressure turbine 43 includes low pressure first turbine blade rows 138 disposed across the low pressure turbine flowpath 28 and is drivingly connected to the first fan blade row 13 by the low pressure inner shaft 130.

The forward low pressure turbine 40 includes second low pressure turbine blade rows 148 disposed across the low pressure turbine flowpath 28 and is drivingly connected to a second fan blade row 15 by the low pressure outer shaft 140. In the exemplary embodiment illustrated in FIGS. 6–9, there are four rows each of the first and second low pressure turbine blade rows 138 and 148. The booster 16 is drivingly connected to one of the low pressure outer shaft 140.

The first low pressure turbine blade rows 138 are disposed downstream of the second low pressure turbine blade rows 148 along the low pressure turbine flowpath 28. One row of low pressure variable vanes 210 is disposed between the first low pressure turbine blade rows 138 and the second low pressure turbine blade rows 148. Rows of non-variable or fixed low pressure vanes 222 are disposed across the low pressure turbine flowpath 28 between first adjacent pairs 218 of the first low pressure turbine blade rows 138 and between second adjacent pairs 219 of the second low pressure turbine blade rows 148. A turbine nozzle 220 is disposed axially forward, upstream of, and adjacent to the second low pressure turbine blade rows 148.

The tandem non-interdigitated counter rotating forward and aft low pressure turbines 40 and 43 and the row of low pressure variable vanes 210 helps the engine to be operated at or near a peak performance by allowing the forward fan to operate at a higher fan pressure ratio and higher rotational speed than the aft fan while avoiding a substantial mismatch in horsepower and rotational speed between the counter rotating low pressure turbines and rotors. This allows the engine to operate with different speed and horsepower ratios such as speed and horsepower ratios of 1.2 or more to help attain peak fan efficiency. The tandem non-interdigitated counter rotating forward and aft low pressure turbines also are of a light weight design and are easily rotatably supported by the engine's static frames.

The exemplary embodiment has an equal number of the first low pressure turbine blade rows 138 and the second low pressure turbine blade rows 148. More particularly, the exemplary embodiment has four of the first low pressure turbine blade rows 138 and four of the second low pressure turbine blade rows 148. The first low pressure turbine blade rows 138 are illustrated as being mounted on low pressure first turbine disks 238 of the low pressure inner shaft turbine rotor 200 and the second turbine blade rows 148 are illustrated as being mounted on low pressure second turbine disks 248 of low pressure outer shaft rotor. Alternatively, the first and second low pressure turbine blade rows 138 and 148 may be mounted on drums of the low pressure inner and outer shaft turbine rotors 200 and 202, respectively. A turbine nozzle 220 is disposed axially forward, upstream of, and adjacent to the second low pressure turbine blade rows 148.

Various configurations of the low pressure turbine may be used. There may be an equal or an unequal number of the first and second low pressure turbine blade rows and there may be three or four or more of each of the first and the second low pressure turbine blade rows.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

1. A gas turbine engine turbine assembly comprising:
   a low pressure turbine having a low pressure turbine flowpath and counter rotatable low pressure inner and outer shaft turbines,
   said inner shaft turbine including first low pressure turbine blade rows disposed across said low pressure turbine flowpath,
   said outer shaft turbine including second low pressure turbine blade rows disposed across said low pressure turbine flowpath,
   at least one adjacent pair of one of said first low pressure turbine blade rows and one of said second low pressure turbine blade rows, and
   at least one row of low pressure variable vanes disposed across said low pressure turbine flowpath between said adjacent pair.

2. An assembly as claimed in claim 1 wherein said adjacent pair is interdigitated having one interdigitated row of said first and second low pressure turbine blade rows interdigitated with an adjacent pair of another of said first and second low pressure turbine blade rows.

3. An assembly as claimed in claim 2 further comprising a first number of said low pressure first turbine blade rows interdigitated with a second number of said low pressure second turbine blade rows.

4. An assembly as claimed in claim 3 further comprising a turbine nozzle disposed axially forward, upstream of, and adjacent to said second low pressure turbine blade rows.

5. An assembly as claimed in claim 2 further comprising a first forwardmost row of said first low pressure turbine blade rows interdigitated with a forwardmost pair of said low pressure second turbine blade rows and said row of low pressure variable vanes disposed between a second forwardmost row of said forwardmost pair of said low pressure second turbine blade rows and said first forwardmost row of said first low pressure turbine blade rows.

6. An assembly as claimed in claim 5 further comprising a turbine nozzle disposed axially forward, upstream of, and adjacent to said second low pressure turbine blade rows.

7. An assembly as claimed in claim 2 further comprising an aftmost row of said second low pressure turbine blade rows interdigitated with an aftmost pair of the low pressure first turbine blade rows and said row of low pressure variable vanes disposed between a second aftmost row of said aftmost pair of said low pressure second turbine blade rows and said aftmost row of said second low pressure turbine blade rows.

8. An assembly as claimed in claim 7 further comprising a turbine nozzle disposed axially forward, upstream of, and adjacent to said second low pressure turbine blade rows.

9. An assembly as claimed in claim 1 wherein said counter rotatable low pressure inner and outer shaft turbines are tandem and non-interdigitated forward and aft low pressure turbines respectively and said row of low pressure variable vanes is axially disposed between said forward and aft low pressure turbines.

10. An assembly as claimed in claim 9 further comprising a turbine nozzle disposed axially forward, upstream of, and adjacent to said second low pressure turbine blade rows.

11. An aircraft gas turbine engine assembly comprising:
   a high pressure spool including a high pressure turbine drivingly connected to a high pressure compressor by a high pressure shaft and rotatable about an engine centerline,
   a low pressure turbine having a low pressure turbine flowpath and located aft of said high pressure spool,
   said low pressure turbine having counter rotatable low pressure inner and outer shaft turbines including counter rotatable low pressure inner and outer shaft turbine rotors respectively,
   said low pressure turbine having low pressure inner and outer shafts respectively which are at least in part rotatably disposed co-axial with and radially inwardly of said high pressure spool,
   said low pressure inner shaft turbine rotor including first low pressure turbine blade rows disposed across said low pressure turbine flowpath and drivingly connected to a first fan blade row by said low pressure inner shaft,
   said low pressure outer shaft turbine rotor including second low pressure turbine blade rows disposed across said low pressure turbine flowpath and drivingly connected to a second fan blade row by said low pressure outer shaft,
   at least one booster drivingly connected to one of said low pressure inner and outer shafts and axially located between said first fan blade row and said high pressure spool,
   said first and second fan blade rows disposed within a bypass duct radially outwardly bounded by a fan casing,
   at least one adjacent pair of one of said first low pressure turbine blade rows and one of said second low pressure turbine blade rows, and
   at least one row of low pressure variable vanes disposed across said low pressure turbine flowpath between said adjacent pair.

12. An assembly as claimed in claim 11 wherein said adjacent pair is interdigitated having one interdigitated row of said first and second low pressure turbine blade rows interdigitated with an adjacent pair of another of said first and second low pressure turbine blade rows.

13. An assembly as claimed in claim 12 further comprising a first number of said low pressure first turbine blade rows interdigitated with a second number of said low pressure second turbine blade rows.

14. An assembly as claimed in claim 13 further comprising a turbine nozzle disposed axially forward, upstream of, and adjacent to said second low pressure turbine blade rows.

15. An assembly as claimed in claim 12 further comprising a first forwardmost row of said first low pressure turbine blade rows interdigitated with a forwardmost pair of said low pressure second turbine blade rows and said row of low pressure variable vanes disposed between a second forwardmost row of said forwardmost pair of said low pressure second turbine blade rows and said first forwardmost row of said first low pressure turbine blade rows.

16. An assembly as claimed in claim 15 further comprising a turbine nozzle disposed axially forward, upstream of, and adjacent to said second low pressure turbine blade rows.

17. An assembly as claimed in claim 12 further comprising an aftmost row of said second low pressure turbine blade rows interdigitated with an aftmost pair of the low pressure first turbine blade rows and said row of low pressure variable vanes disposed between a second aftmost row of said aftmost pair of said low pressure second turbine blade rows and said aftmost row of said second low pressure turbine blade rows.

18. An assembly as claimed in claim 17 further comprising a turbine nozzle disposed axially forward, upstream of, and adjacent to said second low pressure turbine blade rows.

19. An assembly as claimed in claim 11 wherein said counter rotatable low pressure inner and outer shaft turbines are tandem and non-interdigitated forward and aft low pressure turbines and said row of low pressure variable vanes is axially disposed between said forward and aft low pressure turbines.

20. An assembly as claimed in claim 19 further comprising a turbine nozzle disposed axially forward, upstream of, and adjacent to said second low pressure turbine blade rows.

21. An assembly as claimed in claim 19 further comprising:

a core engine inlet to said high pressure compressor, said core engine inlet having an inlet duct splitter, said inlet duct splitter operably disposed adjacent to and downstream of said booster for splitting booster air from said booster into booster air first and second portions, and said inlet duct splitter operable to direct said booster air first portion into said core engine inlet and said booster air second portion around said core engine inlet.

* * * * *